United States Patent [19]

Buist et al.

[11] Patent Number: 5,411,757
[45] Date of Patent: May 2, 1995

[54] PALATABLE BALANCED AMINO ACID-MODIFIED DIET

[76] Inventors: Neil R. M. Buist, 8510 SW. White Pine La., Portland, Oreg. 97225; Annie P. Prince, 1935 Marylhurst Dr., West Linn, Oreg. 97068

[21] Appl. No.: 114,975

[22] Filed: Aug. 31, 1993

Related U.S. Application Data

[63] Continuation of Ser. No. 742,855, Aug. 8, 1991, abandoned, which is a continuation-in-part of Ser. No. 433,714, Nov. 9, 1989, abandoned.

[51] Int. Cl.$^6$ ................................................ A23J 1/00
[52] U.S. Cl. ................................ 426/656; 514/561; 514/562; 514/563; 514/564; 562/553; 562/556; 562/559; 562/562
[58] Field of Search ............... 514/561, 562, 563, 564; 426/656; 562/553, 556, 559, 562

[56] References Cited

U.S. PATENT DOCUMENTS 3,619,200 11/1971 Ferguson et al. ................... 424/438
3,701,666 10/1972 Winitz ................................. 426/656

OTHER PUBLICATIONS

Kitagawa et al., Enzyme, 38:321–327 (1987).
Link, Postgraduate Medical Journal, 1989, 65, 521–624.

*Primary Examiner*—Shailendra Kumar
*Attorney, Agent, or Firm*—Marger, Johnson, McCollon & Stolowitz

[57] ABSTRACT

In the present invention, L-amino acids comprise the medical food which provides a source of protein-equivalent of free purified L-amino acids in a palatable powdered form which can be incorporated into a liquid beverage or into proprietary low-protein solid food products without adversely affecting the organoleptic qualities of these foods. The mixture can act to deliver a protein-equivalent in heretofore unavailable and, thereby, novel ways. Some important considerations contributing to the value of the composition of the L-amino acids and the process by which the amino acid-modified diet is administered are: a protein-equivalent as low in total L-amino acid elements as is nutritionally safe, in quantities to balance the amino acid contributions from the natural foods with up to 100% of certain unpalatable L-amino acids: L-glutamic acid, L-asparatic acid, L-arginine, and L-methionine, replaced by their more palatable counterparts: L-glutamine, L-asparagine, L-citrulline, and L-cystine, respectively; and a dietary prescription which assigns the medical food intake on the basis of both energy and protein needs remaining after the low protein natural foods and proprietary products are accounted for.

10 Claims, No Drawings

PALATABLE BALANCED AMINO ACID-MODIFIED DIET

RELATED APPLICATION

This is a Continuation of application Ser. No. 07/742,855 filed Aug. 8, 1991, now abandoned, which is a Continuation-in-Part of U.S. Ser. No. 07/433,714, filed Nov. 9, 1989, abandoned.

BACKGROUND OF THE INVENTION

This invention relates to amino acid-modified diets, specifically to the composition and administration of an amino acid-modified medical food for patients with certain rare inborn errors of amino acid metabolism in which treatment using medical foods is efficacious; those disorders characterized by enzymatic defects in the degradative pathways of one or more essential amino acids.

BACKGROUND OF THE INVENTION

A rare disorder is defined by the Orphan Drug Act as one that "affects fewer than 200,000 persons in the United States or that affects more than 200,000 persons in the United States and for which there is no reasonable expectation that the costs of developing and making available in the United States a treatment for such disease will be recovered from sales in the United States" (The Orphan Drug Act, Publ Law 97-414, Jan. 4, 1983). The group of disorders known as the inborn errors of amino acid metabolism meet the first criterion of a rare disorder. An estimated 5,000 persons with inborn errors of amino acid metabolism have been identified in the U.S. and followed by treatment programs (Schuett, 1990). Each of these disorders, when untreated, will produce irreversible mental retardation which is largely preventable when affected individuals are administered amino acid modified diets.

The principle of an amino acid-modified diet as a treatment modality for this group of disorders is to ameliorate the biochemical imbalances which result from the amino acid(s) primarily involved. By the process of substrate reduction, one or more offending amino acid substrate(s) are substantially lowered to meet essential nutritional requirements, thereby constituting a severe reduction which comprises 70-95% of total protein requirements.

Strict adherence to the protein-restricted diet eliminates nearly all foodstuffs of animal origin (meat, poultry, fish, milk, eggs, and their products); places severe limits on grains, cereals, and starchy foodstuffs (wheat, corn, rice, potatoes, and their products which include flours, breads, and baked goods), and, thereby, reduces natural foodstuffs to a liberal consumption of relatively few foods, those naturally low in protein (fruits, some vegetables, pure fats and sugars). Without nutritional supplementation, a diet limited to the allowed natural foods would severely compromise protein nutriture and would provide inadequate energy, vitamins, and minerals to support normal growth and development. Therefore, in order to apply the process of substrate reduction to a safe treatment for persons with these disorders, alternative means of nutrition support have been developed, using "medical foods."

The term medical food is defined as "a food which is formulated to be consumed or administered internally under the supervision of a physician and which is intended for specific dietary management of a disease for which distinctive nutritional requirements, based on recognized scientific principles, are established by medical evaluation" (Sec 5, Orphan Drug Act 21 U.S.C. 360 ec). Amino acid-modified mixtures developed to meet the challenges of nutrition support for patients with inborn errors of amino acid metabolism are recognized as examples of medical foods (American Academy of Pediatrics—Committee On Nutrition, 1987). These medical foods have been created primarily to supply protein to patients with these disorders, in a form known as a "protein equivalent," which is purposefully and markedly deficient in one or more essential amino acids. Each protein-equivalent comprises all of the remaining essential amino acids and supplies additional nitrogen from nonessential amino acids. The medical foods incorporate energy from carbohydrate and/or lipid and supply those vitamins and minerals recognized to be essential for humans.

Heretofore, a variety of medical-foods have been developed and implemented for treating inborn errors of amino acid metabolism. When administered to patients as the major source of protein and energy, in combination with natural foods which are carefully prescribed in amounts to supply the essential amount of the offensive amino acid(s), biochemical control of the disorder may be achieved. The amino acid,modified diet has, therefore, revolutionized the treatment and clinical outcomes of certain of these rare disorders.

Phenylketonuria (PKU), a disorder of the essential amino acid, phenylalanine, is the more prevalent and intensively studied of this group of rare disorders. PKU afflicts one in 10,000 U.S. born infants and the U.S. treatment program population with PKU was estimated to comprise 4,100 patients in 1988 (Schuett, 1990). Medical foods with a low phenylalanine content were developed for infants with PKU in the late 1950s and have served as prototypes for the development of medical foods for PKU and other amino acid disorders, largely due to their successes when administered to infants and young children. However, unanticipated problems in the continued acceptance of these products in later childhood and adolescence, with subsequent losses of biochemical control and reductions in intellectual progress, have arisen as the amino acid-modified diet has been applied to persons with PKU for longer periods. A 1988 survey of U.S. PKU treatment programs suggests that more than 40% of persons with PKU by eight years of age are no longer adhering to the dietary treatment, in spite of a consensus among the majority of programs to continue the treatment indefinitely (Schuett, 1990).

The strong and unpleasant organoleptic qualities of low-phenylalanine medical foods are well known to those skilled in the art of administering these foods and are assumed to be an obligatory characteristic of a protein-equivalent (Sarrett and Knauff, 1985). As used in this patent application, the term "organoleptic" refers to the sensory qualifies of foods: tastes, odors, and textures. Low-phenylalanine medical foods have not generally been thought of as foods or beverages in the commercial sense and, heretofore, improving their organoleptic qualities has received little interest by academia or industry. However, medical foods constitute the main food experience for persons who consume them, they do have organoleptic qualities, and, moreover, these qualities affect their acceptance or rejection. With prolonged use, refusal of medical foods as a result of their strong tastes and unwanted odors (Kitagawa et al., 1987) and/or their gritty textures (Francis, 1987( Schuett, 1991 ) has resulted in a need to develop new products and novel ways to deliver a protein-equivalent, energy, and other essential nutrients with acceptable organoleptic qualities for patients as they grow older.

Heretofore, two methods have been applied in the U.S. to create a low-phenylalanine protein-equivalent: 1) Enzymatic or chemical hydrolysis of an existing protein, with subsequent removal of phenylalanine; and 2) Formulation of a combination of purified L-amino acid elements, without the addition of phenylalanine. Both processes yield relatively unpalatable medical foods which are prepared as powders and administered as pastes or as liquid beverages. A third method, developed in Japan, is reported to yield a better tasting protein-equivalent in the form of a low-phenylalanine peptide (LPP) (Kitagawa et al., 1987). Thirty-two healthy subjects found the LPP to be significantly more palatable than conventional low-phenylalanine medical foods. However, only one subject reported "liking" the taste of the LPP. Moreover, 15 of 19 children with PKU, 1½ to 10 years of age, reported the taste of the LPP as "bad", none of the children liked LPP better than the conventional medical foods, and four of the children refused to take the LPP (Kitagawa et al., 1987). These data, along with a reported cost of the LPP which is three to four times higher than that of conventional low-phenylalanine medical foods, have reduced the feasibility of this method and, hence, no medical food comprising a protein-equivalent in this form has been made available on a commercial scale in the U.S.

There are separate nutritional problems besetting prior amino acid-modified diet compositions and the processes used in their administration which have exacerbated the high costs and undesirable organoleptic qualities associated with these diets. These problems become more troublesome at the age when medical foods, like infant formulas, no longer serve as the sole source of nutrition, a process which begins at approximately six months of age when solid natural foods are added to the diet.

Low-phenylalanine medical food compositions have been formulated to supply at least 100% of the requirements for essential nutrients, except phenylalanine and energy, and the recommended method for the administration theoretically ensures the practitioner that they achieve this (Acosta, 1989; Matalon and Matalon, 1989; Francis, 1987). Two erroneous and, heretofore, unrecognized assumptions are associated with this use of a low-phenylalanine diet, thereby reducing its operability beyond early infancy. First, natural foods are assumed to provide little or no contribution to essential amino acid requirements, with the exception of phenylalanine, thereby placing an inappropriately high emphasis on the amino acid contribution of medical foods. Second, the protein-energy density in natural foods is assumed to enable a simultaneous adherence to the severely low natural food protein restriction and the relatively high energy prescription, thereby placing an inappropriately low emphasis on the energy contribution of medical foods. A third related and erroneous, albeit recognized (Francis, 1987), assumption is that a low-phenylalanine protein-equivalent, by its synthetic nature and theoretically low nutritional value, needs to be administered in an amount which yields a total protein intake in excess of standard requirements for nearly all healthy persons; in the U.S., the Recommended Dietary Allowances (RDA) (Acosta, 1989; Matalon and Matalon, 1989). Kindt et al. (1983) showed this assumption to be erroneous in a group of one to two year olds who maintained adequate growth, nutritional status, and biochemical control of PKU over a two year period during which they received the RDA level of protein, primarily as a low-phenylalanine protein-equivalent.

A critical parameter for evaluating the nutritional value of dietary proteins is the essential amino acid composition. By a procedure well-known to those skilled in the art of administering amino acid-modified diets, amino acid scoring, the content of each essential amino acid in a dietary protein (or mixture of proteins) is expressed as a percentage of the same amino acid in the same quantity of protein (generally the milligrams of amino acid per gram of protein) selected as the reference standard. The essential amino acid showing the lowest percentage is referred to as the nutritionally limiting amino acid. The evaluation is thereby dependent upon the reference protein standard chosen. The current recommended standard for the evaluation of the nutritional value of food proteins for persons of all ages is the 1985 Food and Agriculture Organization-World Health Organization-United Nations University essential amino acid requirement pattern for preschool-aged children (FAO, 1990). This pattern suggests that a protein of high nutritional value comprises 22% of the total amino acids as essential amino acids, a substantially lower percentage than the infant pattern of 43% of the total amino acids as essential amino acids (FAO-WHO-UNU, 1985).

All of the prior art products comprise a full complement of the essential amino acids, except phenylalanine. For protein-equivalents derived from hydrolysis of a protein, much of the amino acid pattern of the native protein may be retained. However, the hydrolysis of cow's milk protein (casein), which is the process used in the manufacture of the first developed and most widely administered U.S. product for infants, Lofenalac ® (Mead Johnson, Evansville, Ind.), results in partial conversion of the amide forms of the nonessential amino acids glutamine and asparagine, to their unpalatable dicarboxylic acid forms, glutamic acid and aspartic acid, respectively (Buist, Prince et al. 1991, in press). Free L-amino acid mixtures, which can be formulated to any desired amino acid pattern and is the process used in the manufacture of the most widely administered U.S. product for children and adolescents, Phenyl-Free ® (Mead Johnson, Evansville, Ind.), have incorporated the unpalatable glutamic acid and aspartic acid forms preferentially over glutamine, asparagine, or other more palatable amino acids, thereby creating unduly unpalatable mixtures.

Nayman et al. (1979) has recommended that human milk serve as the reference standard protein for medical foods used to treat inborn errors of metabolism. While human milk is a reference standard for human infant nutrition which has not been improved upon, its amino acid composition has not been shown to be optimal beyond infancy. The prior work of Kitagawa et al. (1987) is the first to offer a rationale for the composition of a low-phenylalanine protein-equivalent, which they specify was based on the amino acid pattern of cow's milk formulas available for infant feeding. Because the protein-equivalent was administered to children of all ages, this composition contradicts the most recent FAO/WHO recommendations that a protein of high nutritional value comprise the reference standard essential amino acid pattern for preschoolaged children (FAO, 1990). Moreover, the manufacture of the majority of formulations appears to be a matter of practical convenience or economic advantage. This is particularly apparent for the nonessential amino acids, for which there is no reference protein standard, and which show a much wider range among the various low-phenylalanine protein-equivalents than the essential amino acids. For example, Phenyl-Free ® comprises a protein-equivalent devoid of L-alanine ($60/kg wt), L-proline ($85/kg wt), and L-serine ($145/kg wt), with relatively large quantities of L-glycine ($11/kg wt) (1990 L-amino acid price list, Ajinomoto USA, Torrance, Calif.), in spite of the work by Harper et al. (1970) which suggests that amino acid imbalances and adverse effects on growth can occur using synthetic proteins over prolonged periods, compromising disproportional intakes of amino acids regardless of their essentiality. Moreover, there is some evidence to suggest that the levels of individual nonessential amino acids influence both the total protein and essential amino acid requirements of humans (Kies, 1974).

The current approach to the administration of the low-phenylalanine diet is to prescribe the natural foods in the amounts estimated to meet the essential phenylalanine requirement; medical foods are prescribed to provide a protein-equivalent in excess of the estimated protein requirement (100–130% above the protein RDA); and additional "free-foods" which are limited to table sugar, jams, jellies, shortening, and candies, are prescribed to meet the remaining estimated energy requirement. The provisions are made for adequate phenylalanine and protein intakes, with an erroneous assumption that adequate energy intakes will follow. Matalon and In Matalon (1989), the daily use of low-phenylalanine proprietary products to help satiate children is recommended, thereby reducing the likelihood of the over consumption of higher-phenylalanine natural foods to meet energy requirements. This process, however, has not been taught by these authors nor by other prior art references which constitute the protocols currently used to administer amino acid-modified diets in the U.S. (Acosta, 1989; Matalon and Matalon, 1989) and in Europe (Francis, 1987).

Link (1990) focused on vitamin and mineral intakes. This approach was not applied to protein and energy. The author computed adequate total protein and energy in a group of adolescents with PKU. However, the sources of energy are not described and the computed mean natural protein intake (19–23 g/day) would have exceeded estimated amounts (5–15 g/day) to maintain biochemical control of PKU (Acosta, 1989; Matalon and Matalon, 1989). The data suggest that energy needs were met, but presumably from natural foods, thereby exceeding phenylalanine requirements. The implication of this report, as well as the experimental work leading to this invention, is that as children with PKU grow older and absolute energy requirements increase, additional energy will need to come from the medical foods and/or low-protein proprietary products which are nearly devoid of phenylalanine.

SUMMARY OF THE INVENTION

The prior art addresses the three components comprising the amino acid-modified diet for persons with PKU; however, the method of administration of these components does not in concept nor in practice balance the overall protein and energy intake. It is heretofore unrecognized that each component has an inherent protein to energy density: 1) low-phenylalanine medical foods which are relatively high in protein and low in energy; 2) low-phenylalanine natural foods which are relatively low in protein and low in energy; and 3) very low or no-phenylalanine proprietary products which are very low in protein and relatively high in energy (Francis, 1987).

Heretofore, prior art has also not recognized medical foods as "foods" which can be used to meet energy needs and to provide satiety to the otherwise highly-restricted, relatively low in energy and satiety and, thereby, unappealing natural foods. On the contrary, medical foods that are concentrated in their protein-equivalent content and supply little or no energy from carbohydrate or fat are used for persons with PKU beyond infancy. Their recommended administration, beginning at age one year is in a small volume, as a "medicine" (Francis, 1987). The theory behind this approach is twofold. First, since the medical foods are unpalatable, the smaller the volume, theoretically the easier these products are to consume. Second, because the medical foods are relatively low in energy, a wider range of natural foods or low-protein proprietary products can be allowed (Francis, 1987). The applicability of this theory is reduced as persons with PKU grow older, absolute energy needs increase, and it becomes increasingly challenging to meet energy requirements from natural foods without exceeding phenylalanine requirements.

In the present invention, L-amino acids comprise the medical food which provides a source of protein-equivalent of free purified L-amino acids in a palatable powdered form which can be incorporated into a liquid beverage or into proprietary low-protein solid food products without adversely affecting the organoleptic qualities of these foods. The mixture can act to deliver a protein-equivalent in heretofore unavailable and, thereby, novel ways. Some important considerations contributing to the value of the composition of the L-amino acids and the process by which the amino acid-modified diet is administered are: a protein-equivalent as low in total L-amino acid elements as is nutritionally safe, in quantities to balance the amino acid contributions from the natural foods with up to 100% of certain unpalatable L-amino acids: L-glutamic acid, L-asparatic acid, L-arginine, and L-methionine, replaced by their more palatable counterparts: L-glutamine, L-asparagine, L-citrulline, and L-cystine, respectively; and a dietary prescription which assigns the medical food intake on the basis of both energy and protein needs remaining after the low protein natural foods and proprietary products are accounted for.

A major objective of the present invention was to create a cost-effective low-phenylalanine protein-equivalent possessing acceptable organoleptic qualities compared with previous medical foods and which could, thereby, be made available on a commercial scale and be used for prolonged periods. In experimental work leading to the present invention, taste-tests of solutions comprising the 20 L-amino acids found in protein-equivalents led to the identification of three particular L-amino acids with the strongest unacceptable tastes in isolation and which were incompatible with other L-amino acids when combined as mixtures (Buist, Prince et at. 1991, in press). The relative unpalatability of these particular L-amino acids, L-aspartic acid, L-glutamic acid, and L-methionine, is not new and was disclosed by Winitz in U.S. Pat. No. 3,701,666 issued Oct. 31, 1972 which claims a process for improving their palatabilities in a complete diet composition administered as an aqueous solution. To be useful beyond infancy, a low-phenylalanine medical food does not require a complete diet composition nor a liquid diet form because the persons for whom such a medical food is intended are able to eat solid natural foods which contribute some nourishment.

The present invention obviates the taste problems associated with L-amino acids by a novel design. All L-amino acids are supplied in the lowest amounts compatible with nutritional balance, accounting for their contributions from allowed natural foods. For those amino acids with more organoleptically acceptable (better in taste, odor, texture) nutritionally equivalent forms, these forms are used preferentially to replace their less palatable counterparts in up to 100% of the mounts determined to be nutritionally necessary in a medical food. The overall composition which incorporates these principles was introduced to 12 persons with PKU, 2–12 years old. Described as "good" in taste, it was accepted by all subjects and is currently being tested for its long-term nutritional and biochemical safety and efficacy in these subjects during a two year clinical research trial (National Institutes of Health Research Award, Gnt. No. 1 R01 H0 26360-01, MRDD).

A second objective of the present invention was to create a low-phenylalanine protein-equivalent composition which yields a high nutritional value and, moreover, a process of administration of the protein-equivalent which results in the lowest estimated safe intake of L-amino acids.

To create a protein-equivalent of high nutritional value, experimental studies leading to the present invention evaluated the essential and nonessential amino acid intakes of six healthy school-aged children who were experiencing adequate growth and of eight school-age children with PKU who were adhering strictly to the dietary treatment. The mean individual essential and nonessential amino acid intakes were computed as milligrams of amino acid per gram of protein (Prince, Buist, Leklem, 1991 b). The essential amino acids in the natural foods consumed by the children with PKU were evaluated relative to the 1990 FAO reference standard and the nonessential amino acids in the diets of the PKU children were compared to intakesof the healthy subjects. The differences comprise the amino acid pattern of the present invention, with the exception of phenylalanine which is devoid in the invention. This composition has not been previously disclosed and offers two distinct advantages over prior art compositions of amino acid-modified protein-equivalents: 1) It accounts for both natural foods and nonessential amino acids and, thereby, is based on the total diet as consumed rather than on the essential amino acids in the medical food as a single protein; and 2) It provides a strategy, with experimental support, for reducing the levels of L-amino acids in a protein-equivalent of high nutritional value. Twelve patients are currently receiving the protein-equivalent as a part of total protein intakes which are planned to provide 100% of the protein RDA. Adequate dietary and plasma amino acid levels, growth, and blood chemistries suggest acceptable protein nutriture.

Using this same concept, a third advantage to the present invention is in its method of use to balance protein, amino acid, and energy intakes. To gain insight into the energy and protein necessary in a low-phenylalanine medical food designed for patients beyond infancy, experimental work assessed the separate contributions of medical foods and natural foods to the total protein and energy intakes of a sample of 15 children and adolescents with PKU (Prince, Buist, Leklem, submitted for publication 1991a). In support of the prior art by Link (1990), the individuals with PKU achieved adequate overall energy and protein intakes, but with excess energy and protein contributed by natural foods, resulting in unacceptable biochemical control for 11 of the 15 patients. Although unrecognized by the prior art of Link and others and, therefore, not obvious to those skilled in the art, these data which led to the present invention suggest that the assumption that the current method for administration of the overall diet can meet energy needs without excess protein and phenylalanine is not valid for school-aged individuals. Therefore, what is needed from a medical food is not only a protein-equivalent, essential vitamins and minerals, but also energy. Experimental work leading to the present invention suggests that a palatable L-amino acid mixture can be compatible with the very low or no-protein proprietary products which offer a substantial source of low-phenylalanine energy. Blinded taste-tests of baked goods made from these products (Wel-Plan Baking Mix ®, Dietary Specialities, New York) fortified with the L-amino acid mixture composition of the present invention have been well-received by healthy controls and patients, thereby offering novel ways to deliver a low-phenylalanine protein-equivalent and energy.

The L-amino acid mixture which comprises the present invention represents the first medical food for school-aged children and adolescents with PKU which can be used to yield a palatable and balanced modified diet with respect to total amino acid, protein, and energy intakes.

More specifically this invention is directed to a balanced palatable modified diet for patients with inborn errors of essential amino acid metabolism. The invention comprises (a) natural foods which are unbalanced or limited for the patients due to deficiencies in essential amino acids, energy and protein; and (b) a protein-equivalent of a plurality of L-amino acids and a medical food or a low protein proprietary product capable of supplying energy formulated to at least an amount required to fortify the limiting deficiencies of essential amino acids, energy and protein in the unbalanced natural foods. Typically, the protein-equivalent of a plurality of L-amino acids are palatable in nature.

The protein-equivalent of L-amino acids can include from about 0 to 99% by weight of L-glutamic acid and from about 1 to 100% of L-glutamine based on the total combined weight of L-glutamic acid and L-glutamine. In that case, the L-glutamine replaces the L-glutamic acid in the protein equivalent of L-amino acids. The protein-equivalent of L-amino acids can also include from about 0 to 99% by weight of L-aspartic acid and from about 1 to 100% of L-asparagine based on the total combined weight of L-aspartic acid and L-asparagine. In that case, the L-asparagine replaces the L-aspartic acid in said protein equivalent of L-amino acids. In another instance, the protein-equivalent of L-amino acids includes from about 0 to 99% by weight of L-arginine and from about 1 to 100% of L-citrulline based on the total combined weight of L-arginine and L-citrulline, wherein the L-citrulline replaces the L-arginine in the protein equivalent of L-amino acids. A further alternative for the protein-equivalent of L-amino acids includes from about 0 to 99% by weight of L-methionine and from about 1 to 100% of L-cystine based on the total combined weight of L-methionine and L-cystine, so that the L-cystine replaces the L-methionine in the protein equivalent of L-amino acids. Moreover, the protein-equivalent of L-amino acids can comprise an amount of L-glutamine which will replace from about 1 to 100% weight of L-glutamic acid in the protein-equivalent of L-amino acids, and/or an amount of L-asparagine which will replace from about 1 to 100% weight of L-aspartic acid in the protein-equivalent of L-amino acids, and/or an amount of L-citrulline which will replace from about 1 to 100% weight of L-arginine in the protein-equivalent of L-amino adds, and/or an amount of L-cystine which will replace from about 1 to 100% weight of L-methionine in the protein-equivalent of L-amino acids.

The protein-equivalent of L-amino acids can be formed by the acetylation or the esterification of the plurality of L-amino acids. This acetylated or esterified product provides modifications in the taste and texture qualities of the L-amino acid constituents.

The subject invention also contemplates a method for producing a balanced palatable modified diet for patients with inborn errors of essential amino acid metabolism. This method comprises (a) providing natural foods which are unbalanced or limited for said patients due to deficiencies in essential amino acids, sources of energy and protein; and (b) combining with said natural foods a palatable protein-equivalent of a plurality of L-amino acids and a medical food capable of supplying sources of energy formulated to at least an amount required to fortify the limiting deficiencies of essential amino acids, energy and protein in said natural foods. In a preferred method, prior to providing the natural foods to the patient, the amount of natural foods which a patient can tolerate is determined by analyzing the blood amino acid level of the patient. It is then compared to the amount of the amino acid in the natural foods. Based on the amount of natural foods which the patient can tolerate, the amount of protein equivalent and medical food to provide to the patient is determined.

Further objects and advantages of the invention will become apparent from a consideration of the following examples and description of the invention.

DETAILED DESCRIPTION OF THE INVENTION

The L-amino acid mixture comprises a protein-equivalent, the composition and administration which will fortify low protein natural foods and proprietary products consumed by persons with inborn errors of amino acid metabolism for which nutritional treatment using an amino acid-modified protein-equivalent and medical foods is efficacious. It is intended that the L-amino acid mixture be incorporated into a variety of liquid or solid food forms as medical foods, thereby balancing the intake of individual amino acids, protein, and energy from low protein natural foods and proprietary products.

The method of use of protein-equivalents, medical foods, natural foods, and proprietary products for persons with the PKU disorder, is described by the prior art (Acosta, 1989; Matalon and Matalon, 1989; Francis, 1987). It is to be understood that the methods and steps used in the composition and administration of the present invention do not incorporate a similar philosophy and that the balanced palatable modified diet will require the new protein-equivalent amino acid composition disclosed in this application. Accordingly, administration of this invention would be by practitioners appropriately trained in its use.

The protein-equivalent is comprised of purified L-amino acids. It should be understood that those skilled in the pertinent art appreciate that individual L-amino acids differ in their organoleptic and nutritional qualities and that practitioners also understand that there are hypothetical "reference proteins" of high quality containing specified patterns of amino acids against which single proteins or a combination of proteins may be evaluated (FAO, 1990). The amino acid proportionality pattern of a protein is considered to be the most important determinant of protein quality (FAO, 1990) and is expressed as a score, derived from the amino acid scoring procedure as amino acid ratios (mg of amino acid in 1 g test protein/mg of the same amino acid in 1 g reference protein) of nine essential amino acids plus tyrosine and cystine. The reference pattern recommended by the 1989 FAO/WHO Expert Consultation on Protein Quality Evaluation for all persons aged one year and older contains (mg amino acid/g protein): histidine, 19; isoleucine, 28; leucine, 66; lysine, 58; methionine plus cystine, 25; phenylalanine plus tyrosine, 63; threonine, 34; tryptophan, 11; valine, 35. The lowest single amino acid ratio is termed the "amino acid score" for the protein and the corresponding amino acid is the "apparent limiting amino acid" in the protein.

In Example 1 of Appendix A, the amino acid scoring procedure is used to compare the essential amino acid pattern of the test U.S. diet (FAO, 1990) and the test amino acid-modified diet (Prince, Buist, Leklem, 1991b) against the recommended reference pattern. The U.S. Food and Nutrition Board subcommittee on the 10th edition of the RDA (FNB, 1989) recommended use of the reference pattern presented in Example 1 for the formulation of special purpose diets in clinical practice. Example 1 shows that there are differences between the essential amino acid pattern of the test U.S. diet and the test amino acid-modified diet, relative to the reference pattern, heretofore unrecognized.

The amino acid-modified diet for persons with inborn errors of amino acid metabolism represents a special purpose diet in its formulation. When the protein-equivalent portion of the diet is comprised of free L-amino acids, the amino acid composition is maximally flexible. Prior art has not disclosed the food group proportions comprising the natural foods which contribute some essential and nonessential amino acids and, thereby, protein to the amino acid-modified diet. Strict adherence to the natural protein restriction would eliminate nearly all of the food groups which supply significant amounts of protein to the average U.S. diet (meat, fish, poultry, 48%; dairy, 17%; eggs, 4%) (USDA, 1983, 1986, 1987), thereby altering the levels and sources of amino acids. Without actual data to describe the reported consumption pattern for the special subpopulation of individuals who consume low-protein natural foods, formulation of a protein-equivalent which would be nutritionally compatible with the levels and sources of amino acids in those foods was heretofore impossible. These data are disclosed in this patent application, illustrated in Example 1, as the essential amino acid pattern of the natural low-protein food intakes reported by eight school children with PKU who were strictly adhering to the prescribed amino acid-modified diet (Prince, Buist, Leklem, 1991b). The ultimate choice of the L-amino acids employed in this invention is a result of these data which were derived from the experimental work done in its development. This approach is in accordance with the current state of protein quality evaluation (FNB, 1989; FAO, 1990) even though its value has not been recognized heretofore by those skilled in the art of designing and administering protein-equivalents for inborn errors of amino acid metabolism. As shown in Example 1, the total essential amino acid proportion of the reference protein is approximately 34 percent of the total amino acid nitrogen (339 mg of each 1 g protein). The remaining amino acid nitrogen can be comprised of nonspecific nitrogen from nonessential amino acids or from essential amino acids fed in excess of need. The reported composition of both the U.S. diet and the natural foods in the amino acid-modified diet supply some of this as essential amino acids, which comprise 42 percent and 39 percent of the total amino acid nitrogen, respectively (See Example 1 ). The remainder is supplied mostly as nonessential amino acids for which no U.S. diet reference pattern has been heretofore disclosed.

To ignore the level and sources of the nonessential amino acids in a chemically-defined protein-equivalent is not in concept with the state of knowledge of the nutritional value of dietary proteins. Nitrogen balance, the classical approach to estimating requirement levels of dietary protein and adequacy of various protein sources, has been shown to be subject to rather drastic changes by source-level variations in dietary supplements of nonessential amino acids (Kies, 1974).

In a novel approach to providing a balanced intake of nonessential amino acids relative to essential amino acids and usual dietary consumption patterns, the choice of the nonessential amino acids employed in this invention was based on the pattern of intake of health, children.

Example 2 in Appendix B, the amino acid scoring procedure is used to compare the nonessential amino acid pattern of the test amino acid-modified diet (Prince, Buist, Leklem, 1991b) against the reference healthy diet pattern (Prince, Buist, Leklem, 1991b). Example 2 shows that there are differences between the nonessential amino acid pattern of the reference diet which constitutes the reported food intakes of six healthy school children (Prince, Buist, Leklem, 1991b) and the test amino acid-modified diet, heretofore unrecognized. The total (essential and nonessential) amino acid intakes are similar between the healthy diet and the amino acid-modified diet, approximately 93 and 94 percent, respectively, when the data from Example I (essential amino acid intake patterns) and Example 2 (nonessential amino acid intake patterns) are combined. There is 6 to 7 percent of the total protein unaccounted for, presumably as other forms of nonspecific nitrogen.

As discussed hereinabove, the composition of the protein component of the palatable balanced modified diet is one of the key aspects of the invention. The specific amino acid composition for this protein-equivalent is important for its operability with respect to achieving the objectives of this invention, relative to palatability and protein quality. The procedure used in the design of the protein-equivalent is illustrated in Example 3 in Appendix C. This composition will work because it accounts for the essential and nonessential amino acids which comprise natural food intakes, it adjusts for the heretofore disclosed organoleptic qualities of particular L-amino acids, and thereby provides a palatable balanced amino acid-modified diet. However, other possible modifications in keeping with the invention disclosure and in the patent claims may be used. In particular, the Example 3 illustrates the composition of a low-phenylalanine protein-equivalent; a similar procedure used to define the amino acid composition could be applied to any disorder of amino acid metabolism, whereby one or more offensive amino acids could be reduced in a protein-equivalent. Likewise other forms of L-amino acids, through the techniques of acetylation and esterification, could be employed to improve palatability or solubility of compounds. For instance, as an example of acetylation, the substitution of L-tyrosine with N-acetyl-L-tyrosine can be conducted. Adjustments in the amino acid pattern of the protein-equivalent may also be necessary to maintain consistency with improvements in the so-called reference protein.

The advantages to the subject composition are illustrated in Example 4 in Appendix D which compares the L-amino acid profiles of conventional low-phenylalanine protein equivalents and of this invention to the reference protein. The amino acid score of the palatable balanced protein-equivalent is improved to 1.00 when combined with natural foods and both sources of amino acids are administered according to the procedure.

Protein synthesis, breakdown, and thus requirements by the body are energy-dependent and thereby sensitive to dietary energy deprivations (FNB, 1989). Administration of a protein-equivalent without concern for adequate energy intake and balance between natural and medical foods overlooks this critical relationship. Prior art has not provided an approach to the administration of the low-phenylalanine diet which ensures the practitioner nor the consumer of the diet that the combination of the diet components: natural foods, proprietary products, and medical foods will achieve the necessary biochemical control of the disorder through the severe natural protein restriction and simultaneously achieve adequate energy intake to promote utilization of the dietary protein. For healthy persons, with adequate energy intake, the safe level of protein intake is reduced below the level necessary if energy intake is inadequate. There are no data to suggest these relationships do not apply to persons who must consume a portion of their protein and energy as medical foods.

As discussed hereinabove, the source-level of the energy component of the palatable balanced amino acid-modified diet is one of the key aspects of the invention. It is desirable to reduce the protein-equivalent to its lowest safe level of intake, thereby providing the lowest levels of unpalatable elements in the diet at the lowest cost (the average cost of L-amino acids is $70/kg, 1990 L-amino acid price list, Ajinomoto USA, Torrance, Calif.). The low-phenylalanine energy sources which are available are more palatable and less expensive than low-phenylalanine protein-equivalents. The specific composition of low-phenylalanine energy is not as critical as its source and level, but all of these factors are important for the operability of this protein-equivalent with respect to achieving the objectives of this invention, relative to its method of use and the provision of a total diet balanced in its amino acid, protein, and energy components. Food consumption data for the United States indicate that approximately 16% of the total food energy of healthy persons is derived from protein (USDA, 1983). This is termed the protein-energy ratio (P:E) and when expressed as a percentage is: PE ratio %=protein (g/100 g)×[(4×100)/food energy (kcal/100 g)]. Despite wide variations in food energy intake, this ratio remains similar for both sexes in all age groups (Pellett, 1990). The ratio in the U.S. diet at approximately 16% is well above the reference ratios of 7–11% which are considered to constitute a dietary intake sufficient in protein relative to energy (Pellett, 1990).

The energy component of the amino acid-modified diet is comprised of natural foods, proprietary products, and conventional medical foods. It should be understood that those skilled in the pertinent art appreciate that the individual diet components differ in their P:E ratios and that practitioners also understand that the ratio of protein to energy in a diet is a useful indicator of protein sufficiency (Beaton and Swiss, 1974). However, the prior art has not discussed the P:E ratio comprising the natural foods and proprietary products which contribute both protein and energy to the amino acid-modified diet. Strict adherence to the natural protein restriction would reduce the sources of energy in the diet, a concept not previously discussed by practitioners. Without actual data to describe the P:E ratios of the natural foods and proprietary products consumed by persons with PKU or other such disorders, formulation of a medical food which would be nutritionally compatible with the P:E ratio of the natural diet was heretofore impossible. These data are disclosed in this patent application and are a result of our novel approach in examining the natural diet contributions of protein and energy, quite separate from the medical food contributions.

A primary objective of the low-protein natural foods and proprietary products in an amino acid-modified diet is to supply natural protein at a level to meet the essential requirement for the offensive amino acid. Secondary objectives include providing energy and variety to the diet. The primary objective of the protein-equivalent and the medical foods by which it is delivered is to supply protein at a level to meet at least 100% of the requirement for all the remaining essential amino acids, and at least 100% of the requirements for protein, vitamins, and minerals (Acosta, 1989). The amount of energy to be supplied by medical foods, as described herein, has not been previously disclosed.

The administration of this invention uses a novel approach in that the primary objective of the protein-equivalent and the medical foods is to supply energy at a level to meet 100% of the total energy requirement once the energy intake from prescribed natural foods is accounted for. In order to administer the medical foods using this procedure, the practitioner must examine the P:E ratio of the natural diet. As discussed hereinabove, the administration of the palatable balanced amino acid-modified diet is one of the key aspects of the invention. It is an object of the present invention to provide a method of use of amino acid-modified protein-equivalents and medical foods which will assure a palatable balanced total diet. Example 5 in Appendix E demonstrates the procedure by which the P:E ratio of one medical food has been formulated for a hypothetic 8-year-old male with PKU, using the protein-equivalent disclosed in this invention. The short-term safety and efficacy of the invention has been demonstrated both clinically and biochemically in 12 persons with PKU who will continue to consume the medical food on a long-term basis (1990 Annual Progress Report, National Institutes of Health Research Award, Gnt. No. R01 H0 26360-01, MRDD).

The list of components and their amounts given in Example 6 in Appendix F comprise the elements of the medical food and natural foods for a daily diet of a hypothetic 8-year-old male with PKU, to result in a total balanced amino acid-modified diet. Other variations are possible. For example, adding the L-amino acid mixture to the low-protein starches used to make breads and pastas.

Having illustrated and described the principles of our invention in a preferred embodiment thereof, it should be readily apparent to those skilled in the art that the invention can be modified in arrangement and detail without departing from such principles.

REFERENCES CITED

U.S. Patent Documents

U.S. Pat. No. 3,701,666 October, 1972 Winitz 99/1

Other Publications

Acosta P. B. Protocol 2: nutrition support of children, adolescents, and adults with phenylketonuria (PKU) using Maxamaid-XP ® medical food for phenylketonuria or Maxamum-XP ® medical food for phenylketonuria. In: Acosta P. B. (ed), The Ross Metabolic Formula System Nutrition Support Protocols 1989 (pp 9–17); Columbus, Ohio: Ross Laboratories.

American Academy of Pediatrics, Committee On Nutrition (1987). Evaluation of new products used in the dietary treatment of infants, children, and pregnant women with metabolic disorders. Evanston, Ill.: American Academy of Pediatrics.

Beaton G. H., Swiss L. D. Evaluation of the nutritional quality of food supplies: prediction of "desirable" or "safe" protein.; calorie ratios. Am J Clin Nutr 1974; 27: 485–504.

Buist N. R. M., Prince A. P., Huntington K. L., Tuerck J. M., Powell B. R., Waggoner D. D. Approaches to the dietary management of hyperphenylalaninemia. In: Desnick R. J. (ed) Treatment of Genetic Diseases 1991; New York: Churchill Livingstone.

Codex Alimentarius Commission Document Alinorm (89/30) 1989. Rome, IT: Food and Agriculture Organization.

Food and Agriculture Organization of the United Nations (FAO). Report of the Joint FAO/WHO Expert Consultation on Protein Quality Evaluation 1990: 1–66.

Food and Agriculture Organization, World Health Organization, United Nations University 1985. Energy and protein requirements: report of a joint FAO/WHO/UNU expert consultation (Tech Rpt Ser No. 724). Geneva, SZ: World Health Organization.

Food and Nutrition Board (FNB). Recommended dietary allowances, 10th ed. 1989. Washington, D.C.: National Academy Press.

Francis, D. E. M. Phenylketonuria. In: Francis D. E. M. (ed). Diets for Sick Children, 4th ed 1987 (pp 224–261); Boston, Mass.: Blackwell Scientific Publications.

Kies K. Comparative value of various sources of nonspecific nitrogen for the human. J Agr Food Chem 1974; 22: 190–193.

Kindt E., Motzfeldt K., Halvorsen S., Lie S. O. Protein requirements in infants and children: a longitudinal study of children treated for phenylketonuria. Am J Clin Nutr 1983; 37: 778–785.

Kitagawa T., Owada M., Aoki K., Arai S., Oura T., Matsuda I. et al. Treatment of phenylketonuria with a formula consisting of low-phenylalanine peptide: a collaborative study. Enzyme 1987; 38: 321–327.

Link R. Phenylketonuria diet in adolescents—energy and nutrient intake—is it adequate? Postgraduate Med J 1989; 65 (suppl 2): 521–524.

Matalon K., Matalon R. Nutrition support of infants, children, and adolescents with phenylketonuria. Metab Curr 1989; 2: 9–14.

National Institutes of Health Research Award, Gnt. No. 1 R01 H0 26360-01, MRDD.

Nayman R., Thomsen M. E., Scriver C. R., Clow C. L. Observations on the composition of mill-substitute products for the treatment of inborn errors of amino acid metabolism. Comparisons with human milk. Am J Clin Nutr 1979; 32: 1279–1289.

Nutrition and Diet Services:(NDS) 1988. Computerized nutrient analysis database for 1800 foods in the U.S. diet; Milwaukie, Oreg.

Pellett P. L. Protein requirements in humans. Am J Clin Nutr 1990; 5a: 723–727.

Prince A. P., Buist N. R. M., Leklem J. E. Contribution of natural foods and medical foods to protein and energy intakes in phenylketonuria, (submitted for publication) 1991a.

Prince A. P., Buist N. R. M., Leklem J. E. An alternative approach to the nutritional treatment of school-aged patients with phenylketonuria based on tastes, intakes, and plasma levels of amino, acids, (submitted for publication) 1991b.

Sarrett H. P., Knauff K. H. Development of special formulas for the dietary management of inborn errors of metabolism. In: Wapnir R. A. (ed). Congenital Metabolic Diseases 1985 (pp 169–185); New York: Marcel Dekker.

Schuett V. E. National survey of treatment programs for PKU and selected other inherited metabolic diseases (DHHS Publ. No. HRS-MCH-89-5). Rockville, Md.: U.S. Govt Printing Office.

Schuett V. E. National PKU News 1991; 3: 8, 10, 11.

United States Department of Agriculture (USDA) 1976–1987. The composition of foods: raw, processed, and prepared (Revised agriculture handbook no. 8-1 to 8-16). Washington, D.C.: U.S. Government Printing Office.

United States Department of Agriculture (USDA) 1983. Nationwide Food Consumption Survey 1977–78. Food Intakes: Individuals in 48 States, Year 1977–78. Report No. I-1. Consumer Nutrition Division, Human Nutrition Information Service. U.S. Department of Agriculture (pp 1–617); Hyattsville, Md.

United States Department of Agriculture (USDA) 1984. Nationwide Food Consumption Survey. Nutrient Intakes: Individuals in 48 States, Year 1977–78. Report No. 1-2. Consumer Nutrition Division, Human Nutrition Information Service. U.S. Department of Agriculture (pp 1–439); Hyattsville, Md.

United States Department of Agriculture (USDA) 1986. Nationwide Food Consumption Survey. Continuing Survey of Food Intakes by Individuals. Men 19–50 Years, 1 Day, 1985. Report No. 85-3. Nutrition Monitoring Division, Human Nutrition Information Service. U.S. Department of Agriculture (pp 1–94); Hyattsville, Md.

United States Department of Agriculture (USDA) 1987. Nationwide Food Consumption Survey. Continuing Survey of Food Intakes by Individuals. Women 19–50 Years and Their Children, 1–5 Years, 4 Days, 1985. Report No. 85-4. Nutrition Monitoring Division, Human Nutrition Information Service (pp 1–182); Hyattsville, Md.

Example 1. Essential Amino Acid Reference Pattern of the U.S. Diet Compared with the Test Pattern of the Amino Acid-Modified Diet

| Amino Acid (mg/g protein) | Reference Pattern | Test U.S. Diet | Ratio Amino Acid Score | Reference Pattern | Test Amino Acid-Modified Diet | Ratio Amino Acid Score |
|---|---|---|---|---|---|---|
| Histidine | 19[1] | —[2] | —[3] | 19[1] | 22[4] | 1.16[5] |
| Isoleucine | 28 | 52 | 1.86 | 28 | 43 | 1.54 |
| Leucine | 66 | 77 | 1.17 | 66 | 74 | 1.12 |
| Lysine | 58 | 68 | 1.17 | 58 | 42 | 0.72 |
| Methionine + cystine | 25 | 35 | 1.40 | 25 | 35 | 1.40 |
| Phenylalanine + tyrosine | 63 | 78 | 1.24 | 63 | 75 | 1.19 |
| Threonine | 34 | 39 | 1.15 | 34 | 36 | 1.06 |
| Tryptophan | 11 | 12 | 1.09 | 11 | 12 | 1.09 |
| Valine | 35 | 54 | 1.54 | 35 | 49 | 1.40 |
| Total essential amino acids | 339 | 415 | — | 339 | 388 | — |

[1]Reference amino acid pattern (FAO, 1990).
[2]Test amino acid pattern based on the essential amino acid composition of reported dietary intakes for healthy persons of all ages (USDA, 1984). No data for histidine available.
[3]Amino acid score of reported test protein is 1.09 with tryptophan as the first limiting amino acid, followed by threonine (1.15) and lysine, leucine (1.17).
[4]Test amino acid pattern based on the essential amino acid composition of the dietary intakes reported by eight school children with PKU strictly adhering to an amino acid-modified diet, as estimated from USDA Food Composition data (USDA, 1976–1987), the primary data source and secondary sources which comprise the Nutrition & Diet Services database (NDS, 1988).
[5]Amino acid score of reported test protein is 0.72 with lysine as the first limiting amino acid, followed by threonine (1.06), tryptophan (1.09), and leucine (1.12).

Example 2. Nonessential Amino Acid Reference Pattern of Healthy Children Compared with the Test Pattern of the Amino Acid-Modified Diet

| Amino Acid (mg/g protein) | Reference Healthy Diet | Test Amino Acid-Modified Diet | Ratio Amino Acid Score |
|---|---|---|---|
| Arginine - citrulline | 52[1] | 50[2] | 0.96[3] |
| Aspartate - asparagine | 83 | 93 | 1.12 |
| Alanine | 45 | 42 | 0.93 |
| Glutamate - glutamine | 221 | 208 | 0.94 |
| Glycine | 41 | 37 | 0.90 |
| Proline | 90 | 70 | 0.78 |
| Serine | 55 | 47 | 0.85 |
| Total nonessential amino acids | 587 | 547 | — |
| Total amino acids | 925 | 935 | — |

[1]Reference amino acid pattern based on the nonessential amino acid composition of the dietary intakes reported by six healthy children, as estimated from USDA Food Composition data (USDA, 1976–1987), the primary data source and secondary sources which comprise the Nutrition & Diet Services database (NDS, 1988).
[2]Test amino acid pattern based on the nonessential amino acid composition of the dietary intakes reported by eight school children with PKU strictly adhering to an amino acid-modified diet, as estimated and computerized from the above sources.
[3]Amino acid score of test protein is 0.78 with proline as the first limiting amino acid, followed by serine (0.85) and glycine (0.90).

Example 3. Derivation of the L-Amino Acid Composition of the Protein-Equivalent Used in the Palatable, Balanced Amino Acid-Modified Diet

| | Column 1 Reference Pattern mg/1 g Protein | Column 2 × 28 g Protein | Column 3 Natural Foods mg/1 g Protein | Column 4 × 8 g Protein | Column 2 − 4 = 5 Medical Food 20 g Protein | Column 6 Final Recipe 20 g Protein Equivalent | Column 4 + 5 = 7 Total Diet 28 g Protein | Column 8 Medical Food mg L-AA/g Protein Equivalent | Column 9 Total Diet mg AA/g Protein |
|---|---|---|---|---|---|---|---|---|---|
| Essential Amino Acids | | | | | | | | | |
| Histidine | 19[1] | 532[2] | 22[3] | 176[4] | 356[5] | 425[6] | 532[7] | 18[8] | 19[9] |
| Isoleucine | 28 | 784 | 43 | 344 | 440 | 530 | 784 | 22 | 28 |
| Leucine | 66 | 1848 | 74 | 592 | 1256 | 1500 | 1848 | 63 | 66 |
| Lysine | 58 | 1624 | 42 | 336 | 1288 | 1545 | 1624 | 64 | 58 |
| Methionine | —[10] | — | 18 | 144 | 210 | 250 | 354 | 10 | 12.5 |
| Cystine | —[11] | — | 17 | 136 | 210 | 250 | 354 | 10 | 12.5 |
| Total S-containing | 25[12] | 700 | 35 | 280 | 420 | 500 | 708 | 20 | 25 |
| Phenylalanine | —[13] | — | 44 | 335 | 0 | 0 | 335 | 0 | 12 |
| Tyrosine | —[14] | — | 31 | 265 | 1164 | 1395 | 1429 | 58 | 51 |
| Total aromatic | 63[15] | 1764 | 75 | 600 | 1164 | 1395 | 1764 | 58 | 63 |
| Threonine | 34 | 952 | 36 | 288 | 664 | 795 | 952 | 33 | 34 |
| Tryptophan | 11 | 308 | 12 | 96 | 212 | 255 | 308 | 11 | 11 |
| Valine | 35 | 980 | 49 | 392 | 588 | 705 | 980 | 29 | 35 |
| Total essential | 339(37%) | | 388(41%) | | | | | 318(34%) | |
| Nonessential Amino Acids | | | | | | | | | |
| Arginine-citrulline | 52[16] | 1456 | 50 | 400 | 1056 | 1265 | 1456 | 53 | 52 |
| Aspartate-asparagine | 83[17] | 2324 | 93 | 744 | 1580 | 1895 | 2324 | 79 | 83 |
| Alanine | 45 | 1260 | 42 | 336 | 924 | 1110 | 1260 | 46 | 45 |
| Glutamate-glutamine | 221[18] | 6188 | 208 | 1664 | 4524 | 5430 | 6188 | 226 | 221 |
| Glycine | 41 | 1148 | 37 | 296 | 852 | 1022 | 1148 | 43 | 41 |
| Proline | 90 | 2520 | 70 | 560 | 1960 | 2350 | 2520 | 98 | 90 |
| Serine | 55 | 1540 | 47 | 376 | 1165 | 1400 | 1540 | 58 | 55 |
| Total nonessential | 587(63%) | | 547(58%) | | | | | 603(65%) | |
| Total amino acids | 926 | | 935 | | | | | 921 | |

(—) indicates no data available
Footnotes to Example 3
[1] 1985 FAO/WHO/UNU suggested pattern of amino acid requirements for preschool children (2–5 years) (FAO-WHO-UNU, 1985). Essential amino acid requirement values, expressed am mg amino acid/kg body weight, were divided by the recommended safe level of protein intake (g protein/kg body weight) to calculate the corresponding amino acid scoring pattern (mg/g protein). The Codex Committee on Vegetable Proteins (CCVP) endorsed the use of this suggested pattern as the reference for calculating amino acid scores for all ages except the infant (Codex Alimentarius Commission Document, FAO, 1989).
[2] RDA protein 7–10 yrs = 28 g (1.0 g/kg), based on median weight (50th percentile) for a reference child of 7–10 yrs (20 kg).
[3] Amino acid values are based on estimated intakes of 8 children with PKU, 8–11 yrs consuming a strict-diet (Prince, Buist, Leklem, 1991b).
[4] Allowed natural protein = 8 g based on an estimated median phenylalanine requirement of 12 mg/kg wt (Matalon and Matalon, 1989 suggest a range of 9–15 mg/kg wt). For each 44 mg phenylalanine in the diet of 8 children with PKU, 1 g protein was provided (Prince, Buist, 1991a). Therefore, a 28 kg child × 12 mg/kg = 336 mg phenylalanine divided by 44 mg/g protein = 8 g protein.
[5] The remaining quantities of amino acids from a protein-equivalent were computed as the difference between columns 2 and 4.
[6] The total dietary protein-equivalent from amino acids, computed as the sum of columns 4 and 6. The values were increased by an additional 20% to account for the water of hydration (MW = 18) lost when an intact protein is hydrolyzed (Kindt et al., 1983).
[7] The total dietary protein intake from natural foods and medical foods, computed as the sum of columns 4 and 5.
[8] Amino acids, mg/1 g protein, in the medical food invention derived from column 5, mg amino acids/20 g protein-equivalent divided by 20. For example, histidine = 356 mg/2 g protein-equivalent final recipe divided by 20 = 18 mg/1 g protein-equivalent.
[9] Amino acids, mg/1 g protein, in the palatable balanced amino acid-modified diet = column 7 divided by 28 g protein.
[10,11] See footnote 12.
[12] Total sulfur amino acids. The total of methionine and cystine used for scoring purposes. Cystine is not an essential amino acid but can be synthesized from methionine. Cystine in a diet can thus "spare" methionine, and the total of the two has been found more satisfactory for scoring purposes than methionine alone (FAO, 1990).
[13,14] See footnote 15.
[15] Total aromatic amino acids includes the contribution of both phenylalanine and tyrosine. Tyrosine is not an essential amino acid but can be synthesized from phenylalanine. Tyrosine in a diet can thus "spare" phenylalanine, and the total of the two comprises the essential requirement (Food & Nutrition Board, 1989).
[16] Citrulline is a non-protein amino acid, for which data concerning the amount in foodstuffs are unavailable. Arginine composition of foods is available and arginine can be synthesized from citrulline. Because L-citrulline may offer organoleptic advantages and, theoretically, should "spare" arginine, the two are considered interchangeable (Buist, Prince et al., 1991, in press).
[17] Asparagine is the amide form of the dicarboxylic amino acid, aspartate, for which data concerning the amount in food-stuffs are not available from USDA. Aspartate composition of foods is available (USDA, 1976–1987). Because L-asparagine offers organoleptic advantages, the two forms are considered interchangeable (Buist, Prince at al., 1991, in press).
[18] Glutamine is the amide form of the dicarboxylic amino acid, glutamine, for which data concerning the amount in food-stuffs are not available from USDA. Glutamate composition of foods is available (USDA, 1976–1987). Because L-glutamine offers organoleptic advantages, the two forms are considered interchangeable (Buist, Prince et al., 1991, in press).

Example 4. L-Amino Acid Composition of Conventional Low-Phenylalanine Protein-Equivalent and the Palatable Balanced Protein-Equivalent Compared to the Reference Pattern[1]

| | Reference Protein | Phenyl-Free(*) | PKU-2(*) | PKU-3(*) | Maxamaid-XP(*) | Maxamum-XP(*) | Palatable Balanced Protein-Equivalent |
|---|---|---|---|---|---|---|---|
| Essential Amino Acids | | | | | | | |
| Histidine | 19[2] | 19(1.00)[3] | 22(1.18)[4] | 22(1.18)[4] | 45(2.37)[5] | 45(2.37)[5] | 18(0.95)[6] |
| Isoleucine | 28 | 45(1.61) | 56(2.00) | 55(1.96) | 60(2.14) | 60(2.14) | 22(0.78) |
| Leucine | 66 | 71(1.07) | 94(1.43) | 93(1.41) | 102(1.54) | 102(1.54) | 63(0.95) |
| Lysine | 58 | 78(1.34) | 68(1.16) | 66(1.14) | 78(1.35) | 78(1.35) | 64(1.10) |

Example 4. L-Amino Acid Composition of Conventional Low-Phenylalanine Protein-Equivalent and the Palatable Balanced Protein-Equivalent Compared to the Reference Pattern[1]

|  | Reference Protein | Phenyl-Free(*) | PKU-2(*) | PKU-3(*) | Maxa-maid-XP(*) | Maxamum-XP(*) | Palatable Balanced Protein-Equivalent |
|---|---|---|---|---|---|---|---|
| Methionine | — | 26 | 22 | 22 | 17 | 17 | 10 |
| Cystine | — | 14 | 22 | 22 | 25 | 25 | 10 |
| Total S-containing | 25 | 40(1.60) | 44(1.76) | 44(1.76) | 42(1.68) | 42(1.68) | 20(0.80) |
| Phenylalanine | — | 0 | 0 | 0 | 0 | 0 | 0 |
| Tyrosine | — | 38 | 56 | 56 | 90 | 91 | 58 |
| Total aromatic | 63 | 38(0.61) | 56(0.88) | 56(0.88) | 90(1.43) | 91(1.44) | 58(0.92) |
| Threonine | 34 | 38(1.13) | 45(1.32) | 44(1.30) | 50(1.47) | 50(1.47) | 33(0.97) |
| Tryptophan | 11 | 12(1.06) | 18(1.59) | 18(1.59) | 20(1.82) | 20(1.82) | 11(1.00) |
| Valine | 35 | 52(1.48) | 68(1.93) | 66(1.88) | 65(1.86) | 66(1.88) | 29(0.83) |
| Total essential | 339 | 393 | 471 | 464 | 552 | 554 | 318 |
| Nonessential Amino Acids |  |  |  |  |  |  |  |
| Arginine | 52 | 28 | 33 | 33 | 80 | 67 | 26 |
| Citrulline | — | 0 | 0 | 0 | 0 | 0 | 26 |
| Total arginine-citrulline | 52 | 28(0.54) | 33(0.63) | 33(0.63) | 80(1.54) | 67(1.29) | 52(1.00) |
| Aspartate | 83 | 218 | 94 | 93 | 65(0.78) | 55(0.66) | 0 |
| Asparagine | — | 0 | 0 | 0 | 0 | 0 | 79 |
| Total aspartate-asparagine | 83 | 218(2.63) | 94(1.13) | 93(1.12) | 65(0.78) | 55(0.66) | 79(0.95) |
| Alanine | 45 | 0(0.00) | 38(0.85) | 38(0.85) | 36(0.80) | 36(0.80) | 46(1.02) |
| Glutmate | 221 | 78 | 199 | 196 | 84 | 102 | 0 |
| Glutamine | — | 197 | 0 | 0 | 0 | 8 | 226 |
| Total glutamate-glutanine | 221 | 275(1.24) | 199(0.90) | 196(0.89) | 84(0.38) | 110(0.50) | 226(1.02) |
| Glycine | 41 | 136(3.32) | 22(0.55) | 22(0.55) | 62(1.50) | 63(1.54) | 43(1.05) |
| Proline | 90 | 0(0.00) | 88(0.98) | 87(0.96) | 72(0.80) | 72(0.80) | 98(1.09) |
| Serine | 55 | 0(0.00) | 50(0.91) | 49(0.89) | 44(0.80) | 45(0.82) | 58(1.05) |
| Total nonessential | 587 | 657 | 524 | 518 | 443 | 448 | 602 |
| Total amino acids | 926 | 1050 | 995 | 982 | 995 | 1002 | 920 |

(*) = Registered Trademark

Footnotes to Example 4

[1] Amino acid ratios, scores using the amino acid scoring procedure, are shown in parentheses where appropriate.
[2] Reference amino acid pattern for essential amino acids based on recommended pattern for all ages (FAO, 1990), reference pattern for nonessential amino acids based on reported intakes of six healthy school children (Prince, Buist, Leklem, 1991b).
[3] Phenyl-Free ® is a free amino acid mixture manufactured and distributed in the U.S. by Bristol-Meyers Co., Evansville IN. The amino acid score is 0.61 with total aromatic amino acids as the first apparent limiting amino acids followed by histidine (1.00).
[4] PKU-2 ®, PKU-3 ® are free amino acid mixtures manufactured by Milupa Corp, Friedrichsburg, Germany, and distributed in the U.S. by Bristol-Meyers. The amino acid score for each is 0.88 with the total aromatic amino acids as the first apparent limiting amino acids followed by histidine (1.18).
[5] Maxamaid-XP ®, Maxamum-XP ® are free amino acid mixtures manufactured by Scientific Hospital Supplies, Inc., Liverpool UK, and distributed in the U.S. by Ross Laboratories, Columbus OH. The amino acid score for each is 1.35 with lysine as the first apparent limiting amino acid followed by the total aromatic amino acids (1.44).
[6] The palatable balanced protein-equivalent has an amino acid score of 0.78 with isoleucine as the first apparent limiting amino acid followed by the total sulfur-containing amino acids (0.80).

Example 5. Sample Diet Prescription Used to Administer the Medical Food and Natural Foods to a Hypothetic 8-Year-Old Male with Phenylketonuria 1. Establish prescription

|  | Reference Intake[1] |
|---|---|
| Phenylalanine (mg) | 335 |
| Protein (g) | 28 |
| Energy (kcal) | 2800 |

2. Fill phenylalanine prescription from natural foods

|  | Natural Food Composition[2] | | |
|---|---|---|---|
|  | /100 kcal | /1 g protein | /335 mgphe |
| Phenylalanine (mg) | 39 | 44 | 335 |
| Protein (g) | 0.9 | — | 8 |
| Energy (kcal) | — | 114 | 900 |

3. Determine energy, protein needed from medical food

|  | Reference Intake | (minus) | Theoretical Intake From Natural Foods | (equals) | Remaining from Medical Foods[3] |
|---|---|---|---|---|---|
| Phenylalanine (mg) | 335 | — | 335 | = | 0 |
| Protein (g) | 28 | — | 8 | = | 20 |
| Energy (kcal) | 1960 | — | 900 | = | 1060 |

[1] Reference phenylalanine intake = 12 mg/kg wt (Matalon and Matalon, 1989); protein = 1.0 g/kg wt (FNB, 1989); energy = 70 kcals/kg wt (FNB, 1989). Median wt = 28 kg (FNB, 1989).
[2] Natural food composition = 39 mg phenylalanine and 0.9 g protein/100 kcal; 44 mg phenylalanine and 114 kcals/1 g protein (Prince, Buist, Leklem, 1991a).
[3] Optimal medical food P:E ratio = 7.5% based on 20 g protein × 4 calories/g/1060 calories. Current medical foods available for hypothetic child with PKU have 20-98% P:E ratios.

Example 6. Composition of Balanced Palatable Medical Food Used to Supply Protein-Equivalent and Energy to a Hypothetic 8-Year-Old Male with Phenylketonuria

| | Medical Food | Natural Foods | Total Diet Per 1 Day | Percent Reference Standard |
|---|---|---|---|---|
| Protein (g) | 20[1] | 8[2] | 28[3] | 100[3] |
| Energy (kcal) | 1060[4] | 900[5] | 1960[6] | 100[6] |
| Amino acids (mg): | | | | |
| Histidine | 356[7] | 176[7] | 532 | 100 |
| Isoleucine | 440 | 344 | 784 | 100 |
| Leucine | 1256 | 592 | 1848 | 100 |
| Lysine | 1288 | 336 | 1624 | 100 |
| Methionine | 210 | 144 | 354 | 100 |
| Cystine | 210 | 136 | 354 | 100 |
| Total sulfur | 420 | 280 | 708 | 100 |
| Phenylalanine | 0 | 335 | 335 | 100 |
| Tyrosine | 1164 | 265 | 1429 | 100 |
| Total aromatic | 1164 | 600 | 1764 | 100 |
| Threonine | 664 | 288 | 952 | 100 |
| Tryptophan | 212 | 96 | 308 | 100 |
| Valine | 588 | 392 | 980 | 100 |
| Arginine-citrulline | 1056 | 400 | 1456 | 100 |
| Aspartate-asparagine | 1580 | 744 | 2324 | 100 |
| Alanine | 924 | 336 | 1260 | 100 |
| Glutamate-glutamine | 4524 | 1664 | 6188 | 100 |
| Glycine | 852 | 296 | 1148 | 100 |
| Proline | 1960 | 560 | 2520 | 100 |
| Serine | 1165 | 376 | 1540 | 100 |
| Gum arabic | (.5%)[8] | — | — | — |
| Gum Tragacanth | (.5%) | — | — | — |

(—) indicates no data available

Footnotes to Example 6

[1] Protein-equivalent for medical food would be approximately 20% higher than values here (refer to Example 3).
[2] Allowed natural protein = 8 g based on an estimated median phenylalanine requirement of 12 mg/kg wt (Matalon and Matalon, 1989). For each 44 mg phenylalanine in natural diets of 8 children with PKU, 1 g protein was provided (Prince, Buist, 1991a). Therefore, a 28 kg child × 12 mg/kg = 336 mg phenylalanine divided by 44 g/g protein = 8 g natural protein.
[3] Reference standard is Recommended Dietary Allowance (RDA) for 7–10 year old male, 1.0 g protein/kg wt, based on median wt of 28 kg.
[4] Energy in medical food based on the use of a protein-free medical food, Periflex ® (Scientific Hospital Supplies, Ltd.) which has been demonstrated to be safe and efficacious when combined with the protein-equivalent of this invention. Amount determined from natural intake, relative to energy requirement (see footnote 5).
[5] Natural food energy = 900 kcals based on experimental work (Prince, Buist, 1991a). For each 1 g protein in natural diets of 8 children with PKU, 114 calories were provided. Therefore, 8 g natural protein × 114 kcals/g = 912 calories.
[6] Reference standard is Recommended Dietary Allowance (RDA) for 7–10 year old male, 70 kcals/kg wt, based on median wt of 28 kg.
[7] Refer to Example 3.
[8] Gum arabic and tragacanth added to medical food at .5% by weight of final food if prepared as a powder diluted to a liquid beverage. These amounts have demonstrated an ability to improve textural qualities.

What is claimed is:

1. In a balanced palatable medical diet for treatment of patients with inborn errors of essential amino acid metabolism including natural foods which are unbalanced or limited for said patients due to deficiencies in essential amino acids and sources of energy and protein, the improvement comprising a palatable protein-equivalent of L-amino acids which comprises an amount of L-glutamine comprising from about 90 to 100% by weight of the total combined weight of L-glutamic acid and L-glutamine in said protein-equivalent of L-amino acids, an amount of L-asparagine which comprises about 90 to 100% by weight of the total combined weight of L-aspartic acid and L-asparagine in said protein-equivalent of L-amino acids, an amount of L-citrulline which comprises up to about 50% by weight of the total combined weight of L-citrulline and L-arginine in said protein-equivalent of L-amino acids, and an amount of L-cystine which comprises from about 20 to 80% by weight of the total combined weight of L-cystine and L-methionine in said protein-equivalent of L-amino acids, the balanced palatable formulation and natural foods together comprising a protein source for about 100% of the protein intake of said patients with inborn errors of metabolism and being nutritionally equivalent to protein from natural food, being compatible with the maintenance of good nutrition and being incorporatable into Medical Foods without compromising the organoleptic properties thereof.

2. The balanced palatable medical diet of claim 1, wherein said deficiencies in essential amino acids and sources of energy and protein comprise phenylketonuria.

3. The balanced palatable medical diet of claim 1 wherein said palatable protein-equivalent of L-amino acids is formed by the acetylation of L-amino acids for producing modifications in the taste and texture qualities of the L-amino acid constituents.

4. The balanced palatable medical diet of claim 1 wherein said palatable protein-equivalent of L-amino acids is formed by the esterification of L-amino acids for producing modifications in the taste and texture qualities of the L-amino acid constituents.

5. The balanced palatable medical diet of claim 1 wherein said palatable protein-equivalent of L-amino acids is prepared as a separate product which is ingestable as is, or is combined with a solid food material, a beverage mix, or a powdered additive which are used to fortify foods with the palatable protein equivalent.

6. In a method for producing a balanced palatable medical diet for treatment of patients with inborn errors of essential amino acid metabolism including natural foods which are unbalanced or limited for said patients due to deficiencies in essential amino acids and sources of energy and protein, the improvement comprising providing a non-palatable protein-equivalent of L-amino acids with a palatable protein-equivalent of L-amino acids which includes the steps of providing an amount of L-glutamine comprising from about 90 to 100% by weight of the total combined weight of L-glutamic acid and L-Glutamine in said protein-equivalent of L-amino acids; providing an amount of L-asparagine which comprises about 90 to 100% by weight of the total combined weight of L-aspartic acid and L-asparagine in said protein-equivalent of L-amino acids; providing an amount of L-citrulline which comprises up to about 50% by weight of the total combined weight of L-citrulline and L-arginine in said protein-equivalent of L-amino acids; and providing an amount of L-cystine which comprises from about 20 to 80% by weight of the total combined weight of L-cystine and L-methionine in said protein-equivalent of L-amino acids, the balanced palatable formulation and natural foods together comprising a protein source for about 100% of the protein intake of said patients with inborn errors of metabolism and being nutritionally equivalent to protein from natural food, being compatible with the maintenance of good nutrition and being incorporatable into Medical Foods without compromising the organoleptic properties thereof.

7. The method of claim 6, wherein said deficiencies in essential amino acids and sources of energy and protein comprise phenylketonuria.

8. The method of claim 6, which further includes the step of forming said palatable protein-equivalent of L-amino acids by the acetylation of said L-amino acids thereby producing modifications in the taste and texture qualities of the L-amino acid constituents.

9. The method of claim 6, which further includes the step of forming said palatable protein-equivalent of L-amino acids by the esterification of said L-amino acids thereby producing modifications in the taste and texture qualities of the L-amino acid constituents.

10. The method of claim 6, which further includes the step of preparing said palatable protein-equivalent of L-amino acids in formulations which can be ingested or prepared by combinination with a solid food material, a beverage, or used as a powdered additive to other foods.

* * * * *